(12) United States Patent
Miller

(10) Patent No.: US 7,632,167 B1
(45) Date of Patent: Dec. 15, 2009

(54) SELECTIVE INSECT TRAPPING SYSTEM

(76) Inventor: David Miller, 167 Sommersby Dr., Jackson, TN (US) 38305

(*) Notice: Subject to any disclaimer, the term of this patent is extended or adjusted under 35 U.S.C. 154(b) by 578 days.

(21) Appl. No.: 11/594,011

(22) Filed: Nov. 7, 2006

Related U.S. Application Data (60) Provisional application No. 60/734,088, filed on Nov. 7, 2005.

(51) Int. Cl.
*A01K 47/06* (2006.01)
*A01M 1/10* (2006.01)

(52) U.S. Cl. ............... 449/15; 449/20; 449/13; 43/121

(58) Field of Classification Search ......... 449/3, 449/13, 14, 15, 16, 20, 22, 23, 46; 43/107, 43/121, 122, 131, 132.1
See application file for complete search history.

(56) References Cited

U.S. PATENT DOCUMENTS

| | | | | |
|---|---|---|---|---|
| 111,204 A | * | 1/1871 | Heckman | 449/22 |
| 1,470,112 A | * | 10/1923 | Cottam | 449/16 |
| 1,607,659 A | * | 11/1926 | Will | 449/15 |
| 2,741,066 A | * | 4/1956 | Conway | 43/121 |
| 5,309,668 A | * | 5/1994 | Barton | 43/121 |
| 5,622,001 A | * | 4/1997 | Kazmierzak | 43/121 |

* cited by examiner

*Primary Examiner*—Rob Swiatek
(74) *Attorney, Agent, or Firm*—Suiter Swantz pc llo (57) ABSTRACT

A selective insect trapping system including a trap entry portion having a groove formed therein, the groove sized for receiving a small hive beetle, the groove having angled side walls which broaden towards a base of the groove for hindering the small hive beetle from climbing out of the groove, the groove having a depth which prevents the small hive beetle from being able to fly out of the groove. The system further includes a receptacle configured for being connected to the trap entry portion, the receptacle being further configured for receiving and containing the small hive beetle. The trap entry portion has a passageway formed therein for allowing passage of the small hive beetle from the groove of the trap entry portion into the receptacle.

20 Claims, 7 Drawing Sheets

SELECTIVE INSECT TRAPPING SYSTEM

CROSS-REFERENCE TO RELATED APPLICATIONS

The present application claims priority under 35 U.S.C. § 119(e) to U.S. Provisional Application No. 60/734,088 entitled: Selective Insect Trapping System filed Nov. 7, 2005, which is hereby incorporated by reference in its entirety.

FIELD OF THE INVENTION

The present invention generally relates to a selective insect trapping system, and more particularly to a selective insect trapping system for bee hives.

BACKGROUND OF THE INVENTION

The small hive beetle (*Aethina tumida*) is a common destructive pest of honey bee colonies, causing damage to the comb, stored honey and pollen. If a small hive beetle infestation is sufficiently heavy, it may cause honey bees to abandon their hive. The small hive beetles can also be a pest of stored combs, and honey (in the comb) awaiting extraction. Small hive beetles typically enter a bee hive by walking into the hive. Once the small hive beetle is inside the hive, its hard exoskeleton serves as an effective protective barrier against the honey bees. At best, the honey bees are typically only able to harass the small hive beetles into hiding in corners at the top of the hive. However, the small hive beetles are often eventually able to find a way to lay their eggs within the hive. Once the eggs hatch, the beetle larvae damage the hive by burrowing into the honey comb and feeding on the honey and pollen. The primary damage to colonies and stored honey caused by the small hive beetle is through this feeding activity of the larvae. Small hive beetle larvae will typically tunnel through a comb containing stored honey or pollen, damaging or destroying the cappings and the comb. The small hive beetle larvae defecate in honey and the honey becomes discolored from the feces. Activity of the larvae also causes fermentation and a frothiness in the honey, which develops a characteristic odor of decaying oranges. Damage and fermentation cause honey to run out of the combs, creating a mess in hives or extracting rooms. Heavy infestations may cause honey bees to leave the hive, which can result in the rapid collapse of even strong colonies.

Accordingly, it would be desirable to provide a selective insect trapping system for bee hives which hinders small hive beetles from entering a hive and/or captures small hive beetles which have already entered the hive.

SUMMARY OF THE INVENTION

Accordingly, an embodiment of the present invention is directed to a selective insect trapping system, including: a trap entry portion having a groove formed therein, the groove sized for receiving a small hive beetle, the groove having angled side walls which broaden towards a base of the groove for hindering the small hive beetle from climbing out of the groove, the groove having a depth which prevents the small hive beetle from being able to fly out of the groove; and a receptacle configured for being connected to the trap entry portion, the receptacle being further configured for receiving and containing the small hive beetle, wherein the trap entry portion has a passageway formed therein for allowing passage of the small hive beetle from the groove of the trap entry portion into the receptacle.

A further embodiment of the present invention is directed to a beehive, including: a plurality of panels, at least one of the panels included in the plurality of panels having a beehive entrance formed therein, the beehive entrance sized for allowing honey bees to enter the beehive; a top cover configured for connecting with the panels for forming an enclosure; and a selective insect trapping system including a trap entry portion having a groove formed therein, the groove sized for receiving a small hive beetle, the groove having angled side walls which broaden towards-a base of the groove for hindering the small hive beetle from climbing out of the groove, the groove having a depth which prevents the small hive beetle from being able to fly out of the groove, the selective insect trapping system further including a receptacle configured for being connected to the trap entry portion, the receptacle being further configured for receiving and containing the small hive beetle, the selective insect trapping system configured for at least one of: positioning in front of the entrance to the beehive for hindering access to the entrance for the small hive beetles and for trapping the small hive beetles; positioning at the entrance to the beehive for hindering access to the beehive via the entrance for the small hive beetles and for trapping the small hive beetles; positioning within the entrance to the beehive for hindering access to the beehive via the entrance for the small hive beetles and for trapping the small hive beetles; positioning under the entrance to the beehive for hindering access to the beehive via the entrance for the small hive beetles and for trapping the small hive beetles; and connecting to the top cover of the beehive for trapping the small hive beetles which have accessed an interior area of the beehive, wherein the trap entry portion has a passageway formed therein for allowing passage of the small hive beetle from the groove of the trap entry portion into the receptacle.

An additional embodiment of the present invention is directed to a top cover for a beehive, including: a surface having an aperture formed therein, the aperture sized for allowing passage of a small hive beetle into a top cover passageway formed within an interior of the top cover and for preventing passage of a bee into the top cover passageway; and a selective insect trapping system configured for connection to the top cover for trapping the small hive beetles, the selective insect trapping system including a trap entry portion having a groove formed therein, the groove sized for receiving the small hive beetle, the groove having angled side walls which broaden towards a base of the groove for hindering the small hive beetle from climbing out of the groove, the groove having a depth which prevents the small hive beetle from being able to fly out of the groove, the selective insect trapping system further including a receptacle configured for being connected to the trap entry portion, the receptacle being further configured for receiving and containing the small hive beetle, the trap entry portion having a passageway formed therein for allowing passage of the small hive beetle from the groove of the trap entry portion into the receptacle, wherein the top cover passageway is configured for directing the received small hive beetle towards the trap entry portion.

It is to be understood that both the foregoing general description and the following detailed description are exemplary and explanatory only and are not necessarily restrictive of the invention as claimed. The accompanying drawings, which are incorporated in and constitute a part of the specification, illustrate embodiments of the invention and together with the general description, serve to explain the principles of the invention.

BRIEF DESCRIPTION OF THE DRAWINGS

The numerous advantages of the present invention may be better understood by those skilled in the art by reference to the accompanying figures in which.

DETAILED DESCRIPTION OF THE INVENTION

Reference will now be made in detail to the presently preferred embodiments of the invention, examples of which are illustrated in the accompanying drawings.

Figure 1:
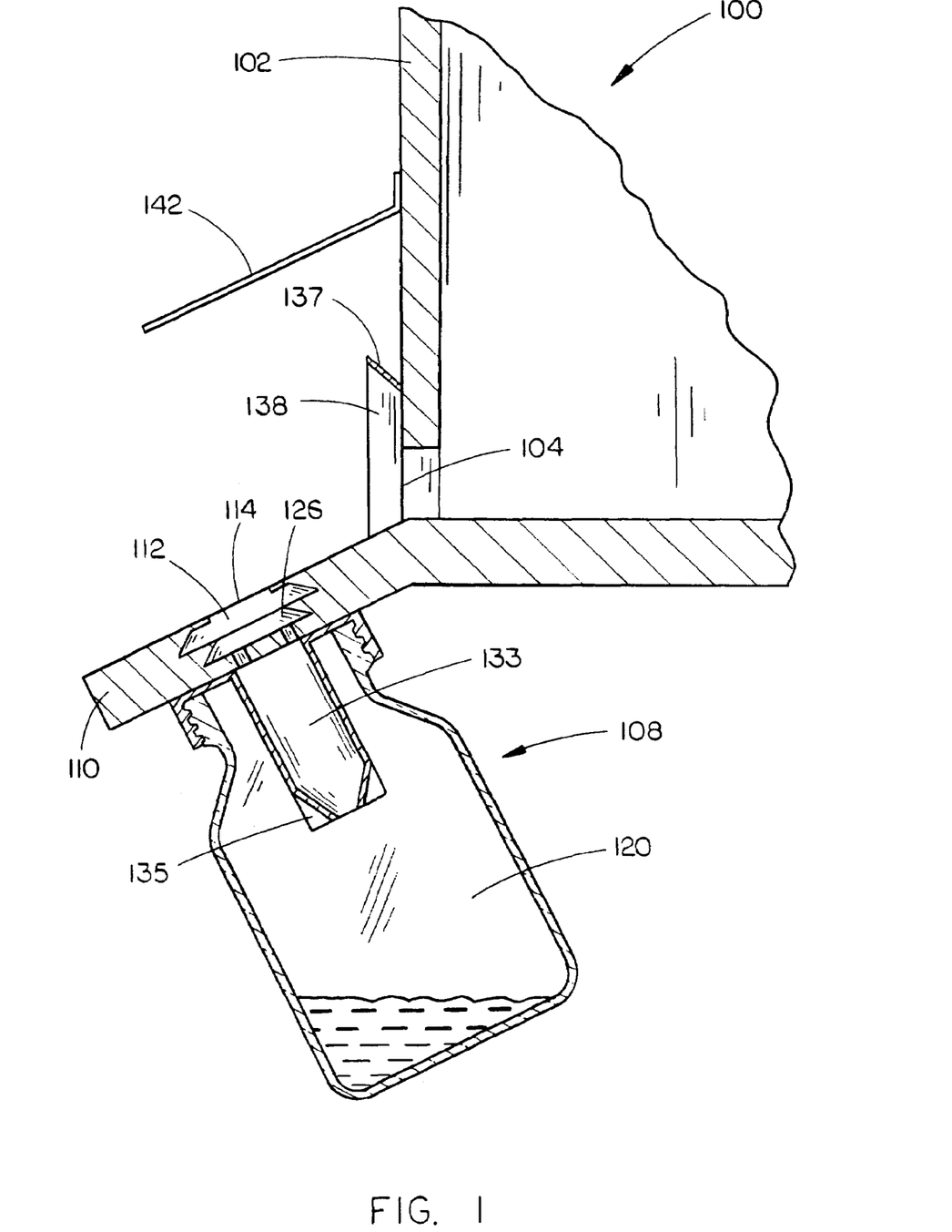
FIG. 1 illustrates a beehive including a selective insect trapping system for guarding the entrance of the beehive in accordance with exemplary embodiments of the present invention.
Figure 4A:
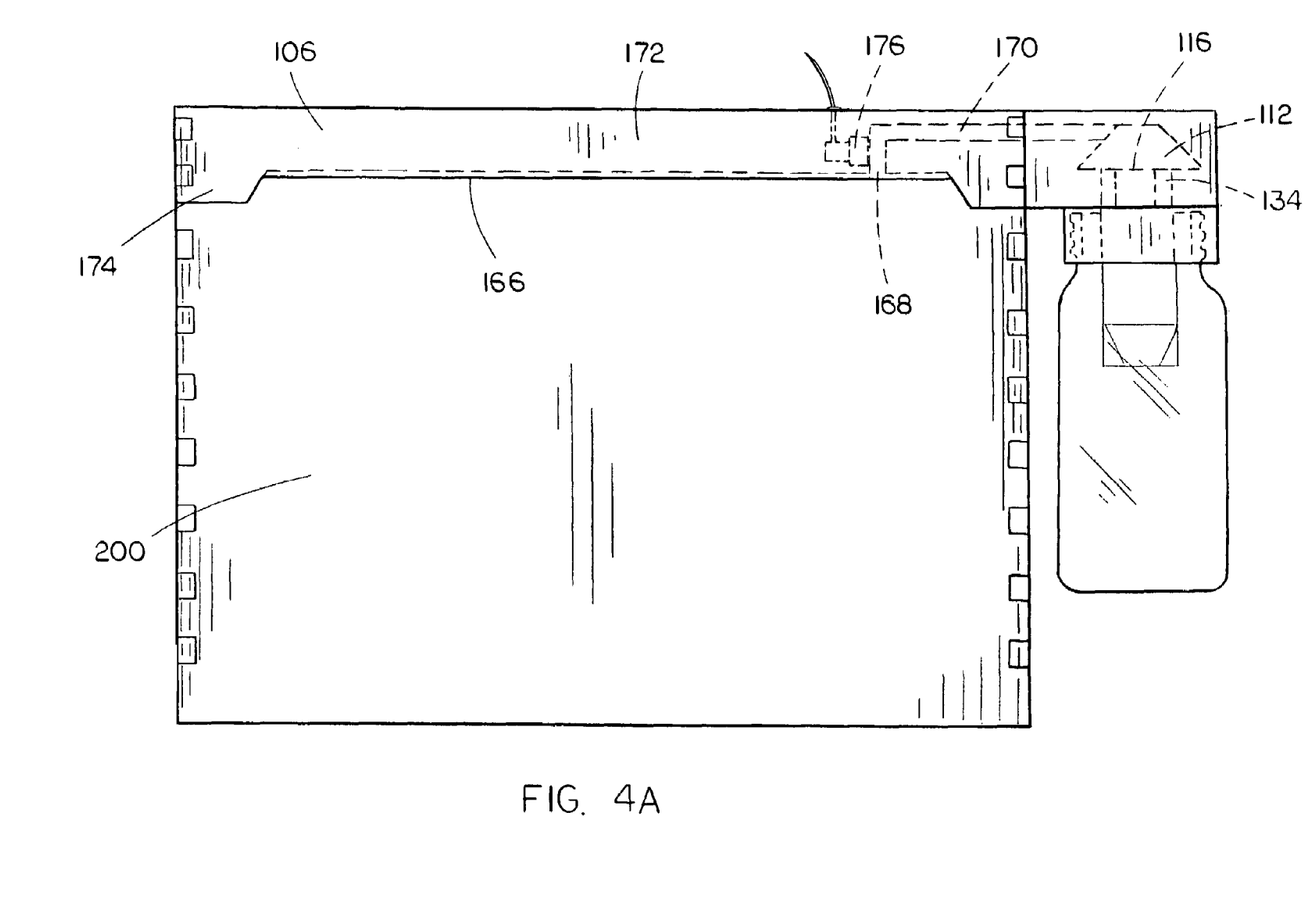
FIGS. 4A and 4B illustrate an edge view and a bottom view respectively of a beehive top cover incorporating the selective insect trapping system in accordance with alternative exemplary embodiments of the present invention.
Figure 4B:
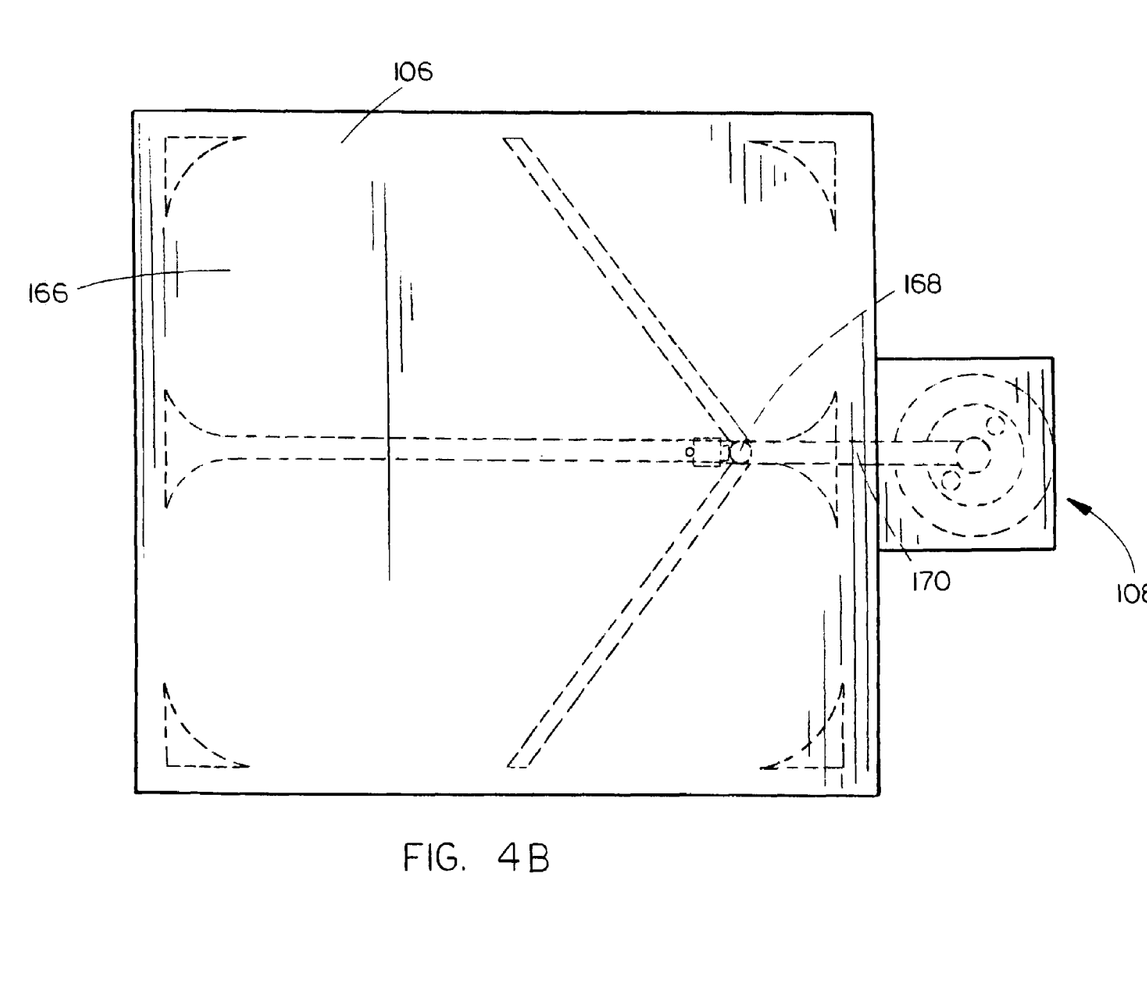

Referring generally now to FIG. 1, a beehive 100 in accordance with an exemplary embodiment of the present invention is shown. For example, the beehive may be a Langstroth hive, a top-bar hive or the like. In a present embodiment, the beehive 100 includes a plurality of panels 102, at least one of the panels included in the plurality of panels having a beehive entrance 104 formed therein. In an exemplary embodiment, the beehive entrance 104 is sized for allowing honey bees to enter the beehive 100. In further embodiments, the beehive 100 includes a top cover 106, as shown in FIGS. 4A and 4B, the top cover being configured for connecting with the panels 102 for forming an enclosure.

In current embodiments, the beehive 100 includes a selective insect trapping system 108. As shown in FIG. 1, the system 108 may be configured for being positioned in front of the beehive entrance 104 for: 1) hindering access to the entrance/entry into the hive via the entrance by small hive beetles (*Aethina tumida*); and 2) for trapping the small hive beetles. The system 108 includes a trap entry portion 110 having a groove 112 formed therein. In embodiments as shown in FIG. 1, the trap entry portion is positioned in front of the hive entrance 104 so that small hive beetles and honey bees may walk on the trap entry portion 110 as they proceed toward the hive entrance 104. In present embodiments, the groove 112 is sized for receiving a small hive beetle. The groove 112 may be configured so that a typical-sized small hive beetle (ex.—a small hive beetle which is 5.7 mm in length, 3.2 mm in width) cannot walk or jump over the groove, yet, typical-sized honey bees may easily walk over the groove and enter the hive. For example, the groove 112 may have a width ranging from 0.1 to 0.2 inches at the groove's entry point/groove opening 114 generally opposite a base 116 of the groove. Preferably, the groove 112 has a width of less than 0.14 inches at the groove's entry point/groove opening 114 generally opposite the base 116 of the groove. In the present embodiment, the trap entry portion 110 is positioned in front of the hive entrance 104 and the groove 112 of the trap entry portion 110 guards the hive entrance in such a manner that small hive beetles walking on the trap entry portion 110 towards the hive entrance are forced to go down into the groove 112 in order to continue walking towards the hive entrance. In further embodiments, the trap entry portion 110 may be positioned so that the groove 112 of the trap entry portion is positioned at or within the hive entrance 104 for hindering access to the beehive via the entrance 104 for the small hive beetles and for trapping the small hive beetles. In still further embodiments, the trap entry portion 110 may be positioned so the groove 112 of the trap entry portion is positioned under the hive entrance 104.

Figure 2:
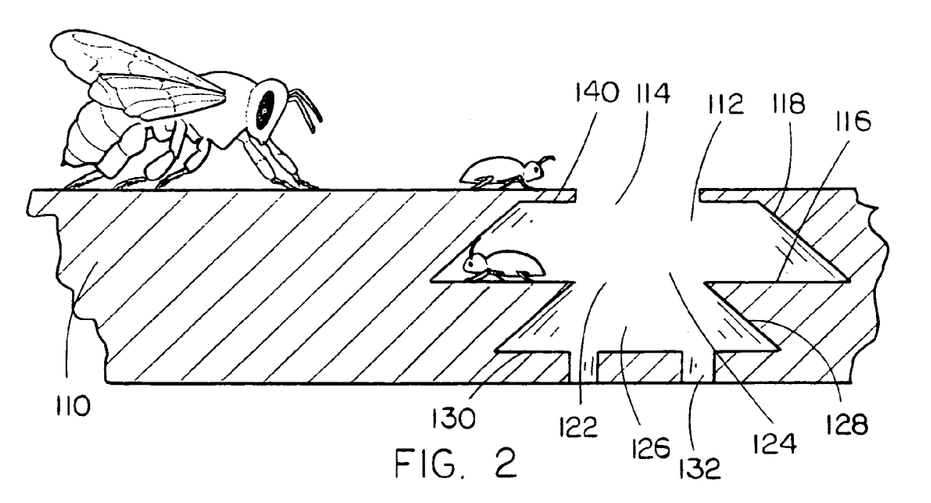
FIG. 2 illustrates a trap entry portion of a selective insect trapping system in accordance with exemplary embodiments of the present invention.

In an exemplary embodiment, as shown in FIG. 2, the groove 112 has angled side walls 118, which angle out from 10 to 40 degrees so that the groove broadens towards the base 116 (i.e., widens out from top to bottom). Preferably, the angled side walls 118 angle out from 20 to 30 degrees. Such configuration causes the small hive beetles, once received within the groove 112, to follow the crease or angle of the side walls 118, thereby hindering small hive beetles from climbing out of the groove. (i.e., exiting the groove via the groove opening/entry point 114). In further embodiments, the groove 112 is of a sufficiently shallow depth (i.e., is sufficiently confining) that the small hive beetles, once received within the groove, cannot fully spread/extend their wings and thus, cannot fly out of the groove opening 114. For instance, the depth of the groove 112 may be less than 0.3 inches, preferably 0.15 through 0.25 inches.

In present embodiments, the selective insect trapping system 108 further includes a receptacle 120 configured for being connected to the trap entry portion 110. In current embodiments, the receptacle 120 is further configured for receiving and containing small hive beetles. For example, the receptacle 120 may be a bottle containing a liquid, such as oil, for drowning small hive beetles which are received by the receptacle. In exemplary embodiments, the trap entry portion 110 has a passageway 122 formed therein for allowing passage of the small hive beetle from the groove 112 of the trap entry portion 110 into the receptacle 120. For instance, in embodiments as shown in FIG. 1, the base 116 of the groove 112 may have an aperture 124 formed therein sized for allowing a small hive beetle received within the groove to descend into and be received by a trap chamber 126. The trap chamber 126 may include angled side walls 128 and a base 130 and may further be configured with dimensions similar to the groove 112 described above for preventing small hive beetles from climbing up and out of the top trap chamber 126. In additional embodiments, the base 130 of the trap chamber 126 may have one or more apertures 132 formed therein sized for allowing the small hive beetle received within the trap chamber 126 to enter the receptacle 120.

In further embodiments, as shown in FIGS. 4A and 4B, the passageway 122 allows for direct passage of small hive beetles from the groove 112 into the receptacle 120 via one or more apertures 134 formed in the base 116 of the groove, said apertures 134 sized for allowing passage of the small hive beetle into the receptacle. In present embodiments, the passageway 122 allows for passage of the small hive beetle into the receptacle 120 via a funnel-shaped tube 133 connected to the trap entry portion 110. An external collar apparatus 135 may be connected with the funnel-shaped tube 133, the funnel-shaped tube and external collar apparatus configured and sized for guiding the small hive beetles into the receptacle 120 and hindering the small hive beetles from flying out of the receptacle. For instance, the funnel-shaped tube 133 may be configured with an opening measuring from ⅜ inch to ½ inch.

In a present embodiment, the beehive 100 includes an angled top barrier entrance wall 137 mounted above the hive entrance 104. In further embodiments, the beehive 100 includes a plurality of angled side barrier entrance walls 138 mounted at the sides of the hive entrance 104. In exemplary embodiments, the top and side barrier entrance walls (128, 130) are angled or tilted towards small hive beetles which are approaching the hive entrance 104 from outside of the hive 100. For example, the top and side barrier entrance walls may be positioned at angles from 10 to 40 degrees, and preferably from 20 to 30 degrees. Upon contacting the barrier entrance walls (137, 138), due to the angled positioning of said walls, the small hive beetles will characteristically tend not to climb the wall, but rather will follow the "crease" of the angle, which leads them away from the hive entrance 104. Therefore, the top and side barrier entrance walls (137, 138) may serve to hinder entry of small hive beetles which may be attempting to fly into the beehive 100 via the beehive entrance 104.

In further embodiments, the groove 112 and/or trap chamber 126 of the trap entry portion 110 may be constructed or contoured to include at least one overhang lip or partial ceiling 140 at the entry point 114 of the groove 112 to further deter small hive beetles received within the groove from flying out of the groove via the groove opening/entry point 114 of the groove.

In current embodiments, the beehive 100 may include an awning or a small roof 142 mounted above the hive entrance 104, the angled top barrier entrance wall 137, and the trap entry portion 110 for keeping debris and rain out of the angled top barrier entrance wall and the groove 112 of the trap entry portion. Further, the awning or small roof 142 may serve as an extra barrier of protection for preventing small hive beetles from flying into the hive 100 via the hive entrance 104.

Figure 6:
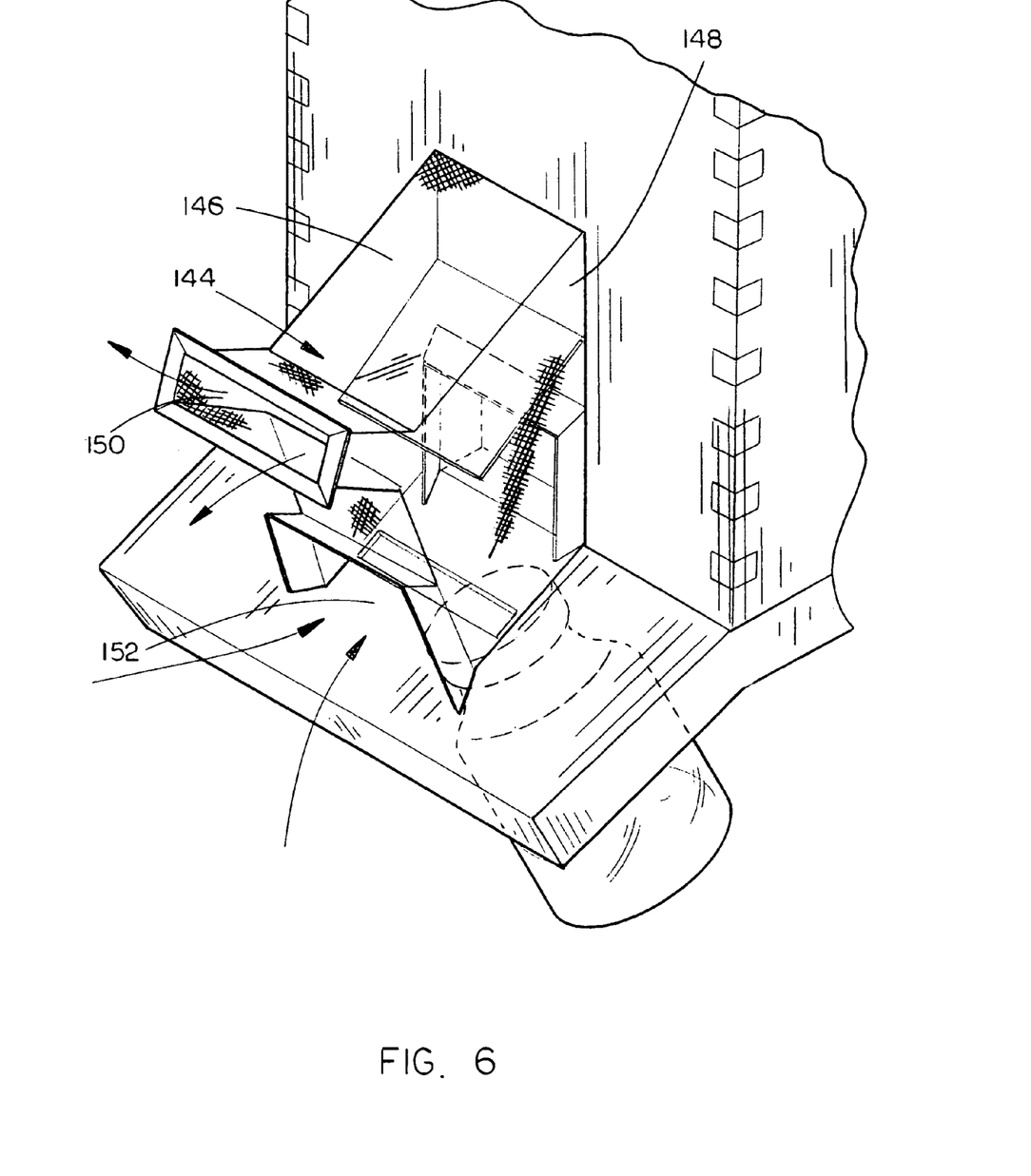
FIG. 6 illustrates a beehive including a selective insect trapping system and screened enclosure for guarding the entrance of the beehive in accordance with an exemplary embodiment of the present invention.

In additional embodiments, the beehive 100 may include a screened enclosure 144 (as shown in FIG. 6) for deterring pests, such as small hive beetles and wax moths, from flying into the hive entrance 104. The screened enclosure 144 includes a roof 146 and side panels 148 and is positionable for at least substantially covering the hive entrance 104 and the trap entry portion 110 including the groove 112 of the trap entry portion, thereby guarding against dust/debris from entering the hive 100. The screened enclosure 144 may be configured with a screened enclosure exit 150, such as a funnel-shaped opening, sized for allowing honey bees to fly out of the enclosure. For example, the screened enclosure exit 150 may be ½ inch to ¾ inch in diameter. The screened enclosure 144 may further be configured with a lower opening or screened enclosure entrance 152 sized to allow honey bees and small hive beetles to walk into the screened enclosure, on the trap entry portion 110, towards the groove 112 of the trap entry portion and also towards the hive entrance 104. For instance, the screened enclosure entrance 152 may be ½ inch to ¾ inch in diameter. The small hive beetles and wax moths are typically drawn to heat and scents which emanate from a beehive. When implementing the screened enclosure 144 of the present invention, heat and scents may emanate from the screened enclosure across at least a substantial portion of its surface area. Thus, small hive beetles and wax moths may be drawn to the screened enclosure 144 in general, and may have difficulty pinpointing the exact location of the hive entrance 104. In additional embodiments, the screened enclosure exit 150 and/or the screened enclosure entrance 152 may further include top and side angled barrier entrance walls configured as described above for further deterring small hive beetles and wax moths from entering the hive entrance 104.

Figure 3:
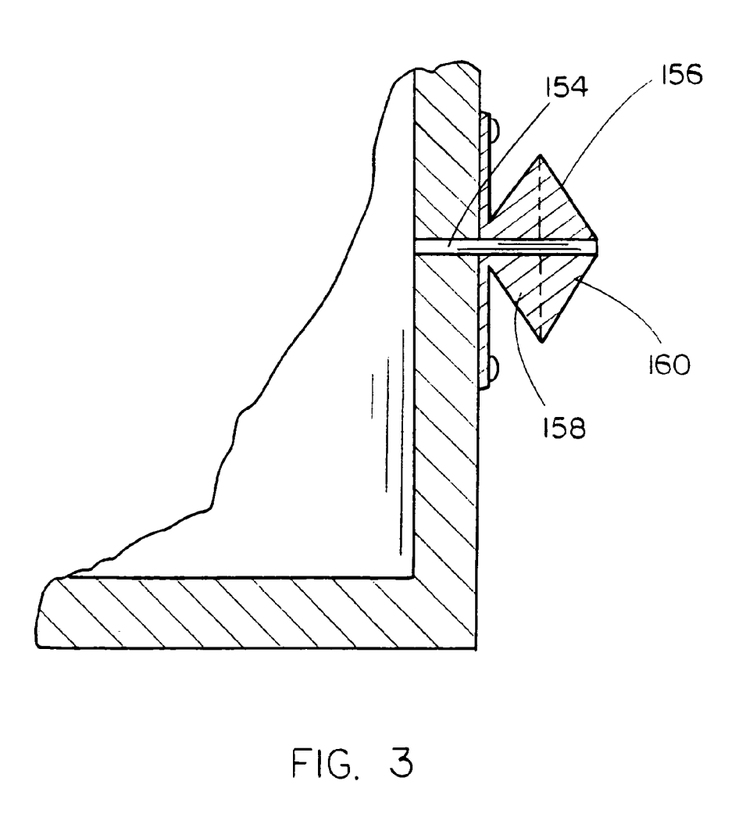
FIG. 3 illustrates a beehive including a ventilation aperture guard device for inhibiting entry of small hive beetles into the beehive in accordance with an exemplary embodiment of the present invention.

Referring generally to FIG. 3, at least one of the plurality of panels of the beehive 100 may have one or more ventilation apertures 154 formed therethrough. Typically, such ventilation apertures generally range from ¼ inch to ⅝ inch in diameter. Preferably, the ventilation apertures range from ⅜ inch to ½ inch in diameter. In a present embodiment, each of the one or more ventilation apertures 154 may be configured with a guard device 156 for guarding the ventilation aperture and deterring flying pests, such as small hive beetles, from entering the hive 100 via the ventilation aperture 154. In an exemplary embodiment, the guard device 156 includes a circular, angled wall configured for being placed/mounted around the ventilation aperture 154 of the beehive 100. In an exemplary embodiment, the circular, angled wall forms a first funnel 158, having a broad end and a narrow end, the broad end oriented away from the hive. The guard device 156 further includes a second circular, angled wall, which forms a second funnel 160, having a broad end and a narrow end, the broad end of the second funnel 160 being oriented towards the hive 100 and being placed over the first funnel 158. The narrow end of the second funnel 160 is sized to hinder small hive beetles from entering the second funnel and proceeding towards the ventilation aperture 154. For instance, the narrow end of the second funnel may have a ⅜ to ½ inch diameter. In further embodiments, the guard device 156 may be unitary in its construction.

Figure 5:
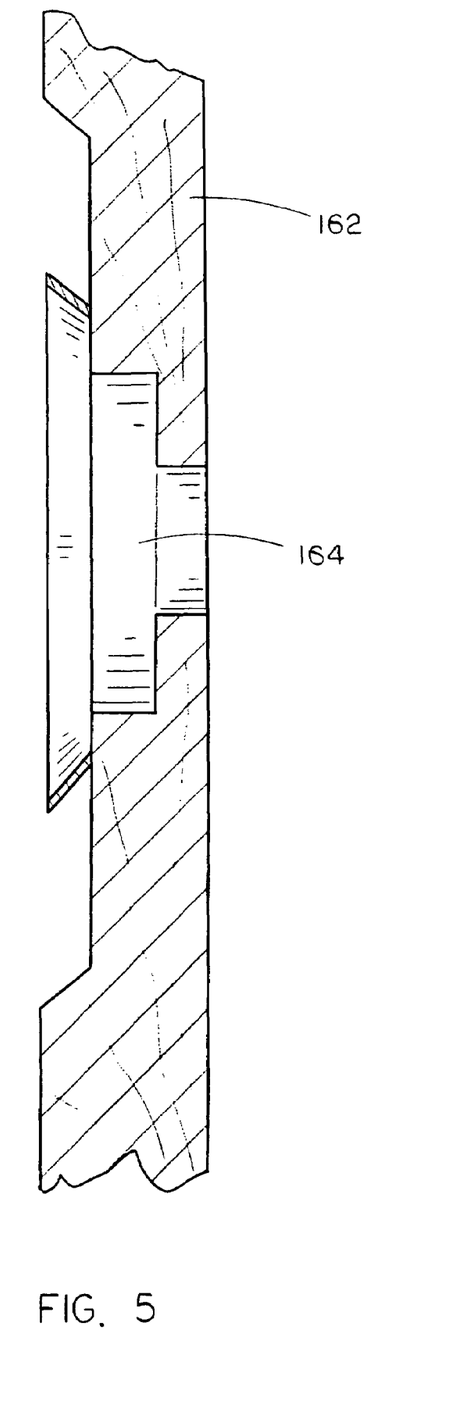
FIG. 5 illustrates a mounting board of a beehive, the mounting board including a bee escape for inhibiting entry of small hive beetles into the beehive in accordance with an exemplary embodiment of the present invention.

Referring generally to FIG. 5, the beehive 100 may further include a mounting board 162 having a bee escape 164 recessed into the mounting board and configured therethrough. For instance, the bee escape 164 may have a ¼ inch to ⅜ inch diameter. Preferably, the bee escape has a ⁵⁄₁₆ inch diameter. Further, the bee escape 164 may be guarded by top and side angled barrier entrance walls configured as described above for hindering small hive beetles from accessing the bee escape 164.

In an alternative embodiment of the present invention, as shown in FIGS. 4A and 4B, the selective insect trapping system 108 may be configured for connection to and/or incorporation with the top cover 106 of the beehive 100 for trapping small hive beetles which have accessed the interior area 200 of the beehive. For instance, if small hive beetles do manage to enter the hive 100, typically they hide in small crevices, or corners near the top of the hive, where the honey bees have difficulty bothering them. In a present embodiment, the top cover 106 includes a surface 166, such as an underside surface, having one or more apertures 168 formed therein, each aperture 168 being sized for allowing passage of a small hive beetle, but preventing passage of a honey bee, into one or more top cover passageways 170 formed within an interior 172 of the top cover. For example, each aperture 168 may be approx. ⅛ to ¼ inches in diameter. In the present embodiment, the top cover passageway 170 is configured for directing and allowing passage of a received small hive beetle towards the trap entry portion 110. In exemplary embodiments, the selective insect trapping system 108 is configured as described above and functions to trap small hive beetles by receiving the small hive beetle into the groove 112 of the trap entry portion 110, and into the receptacle 120 of the trapping system 108 via the passageway 122 of the trap entry portion 110, as also described above. Preferably, the apertures 168 are formed in the top cover 106 near a perimeter of the top cover to provide a shorter distance/path between the apertures and the trapping system 108. In additional embodiments, the surface 166 having the aperture(s) 168 formed therein, may further be constructed with at least one of recesses, walls and partitions for directing the small hive beetle towards the aperture.

In an exemplary embodiment, the top cover 106 of the present invention is sized to create a larger cavity between top bars, for example, of a top-bar hive, and the top cover 106, than occurs with conventional beehive covers. For instance, the top cover 106 of the present invention may be sized and constructed to allow a space measuring from ¼ inches to ⅜ inches from the top bars to the underside surface 166 of the top cover. Preferably, the top cover 106 of the present invention may be sized and constructed to allow a space measuring 5/16 inches from the top bars to the underside surface 166 of the top cover. The extra space allows honey bees to patrol the space between the top bars of the hive and the top cover, thus deterring small hive beetles from hiding near the top of the hive. In further embodiments, the top cover 106 may include rounded or "filleted" corners 174 which may protrude into/be received by the beehive so as to eliminate corner hiding spaces for small hive beetles which have entered the hive.

In further embodiments, an electronic insect control system 176 configured for killing insects, such as small hive beetles and wax moths, may be incorporated into the one or more of the top cover passageways 170, recesses, walls or partitions of the top cover 106. The electronic insect control system 176 may include one or more electrodes (ex.—positive plate, negative plate). In alternative embodiments, the electronic insect control system 176 may be built into or positioned proximally to the angled top barrier entrance wall 137 and/or the angled side barrier entrance walls 138 mounted above/at the sides of the hive entrance 104. For instance, the angled top barrier entrance wall 137 and/or angled side barrier entrance walls 138 may guide small hive beetles toward the electronic insect control system 176. In further embodiments, the electronic insect control system 176 may be built into or proximal to angled barrier entrance walls which guard the bee escape 164 or may be built into or proximal to the guard device 156, which guards the ventilation aperture 154. In still further embodiments, the electronic insect control system 176 may be positioned within the groove 112 for killing/stunning beetles, therefore allowing the stunned/killed beetles to fall into the receptacle 120 and drown/collect in the oil. In other embodiments, the electronic insect control system 176 may be positioned so that when insects are killed/stunned (ex.—"zapped"), the dead/stunned insects will "fall back" into the interior of the beehive 100, where they may be removed from the hive 100 by the bees. In current embodiments, the electronic insect control system 176 may generate an electrostatic charge for stunning or killing the small hive beetles. The electrostatic charge generated by the electronic insect control system 176 may be generated via battery power, solar power or the like. The electrostatic charge generated by the electronic insect control system 176 may be continuous, pulsating or triggered by the difference in resistance detected when a small hive beetle contacts both positive and negative plates of the electronic insect control system 176. In additional embodiments, the electronic insect control system 176 may be used in addition to the selective insect trapping system 108 connected with the top cover 106 or may be used as the sole mechanism for trapping insects (ex.—small hive beetles) which have accessed the interior of the beehive 100 (i.e., in place of using the insect trapping system 108 connected to the top cover 106).

Figure 7:
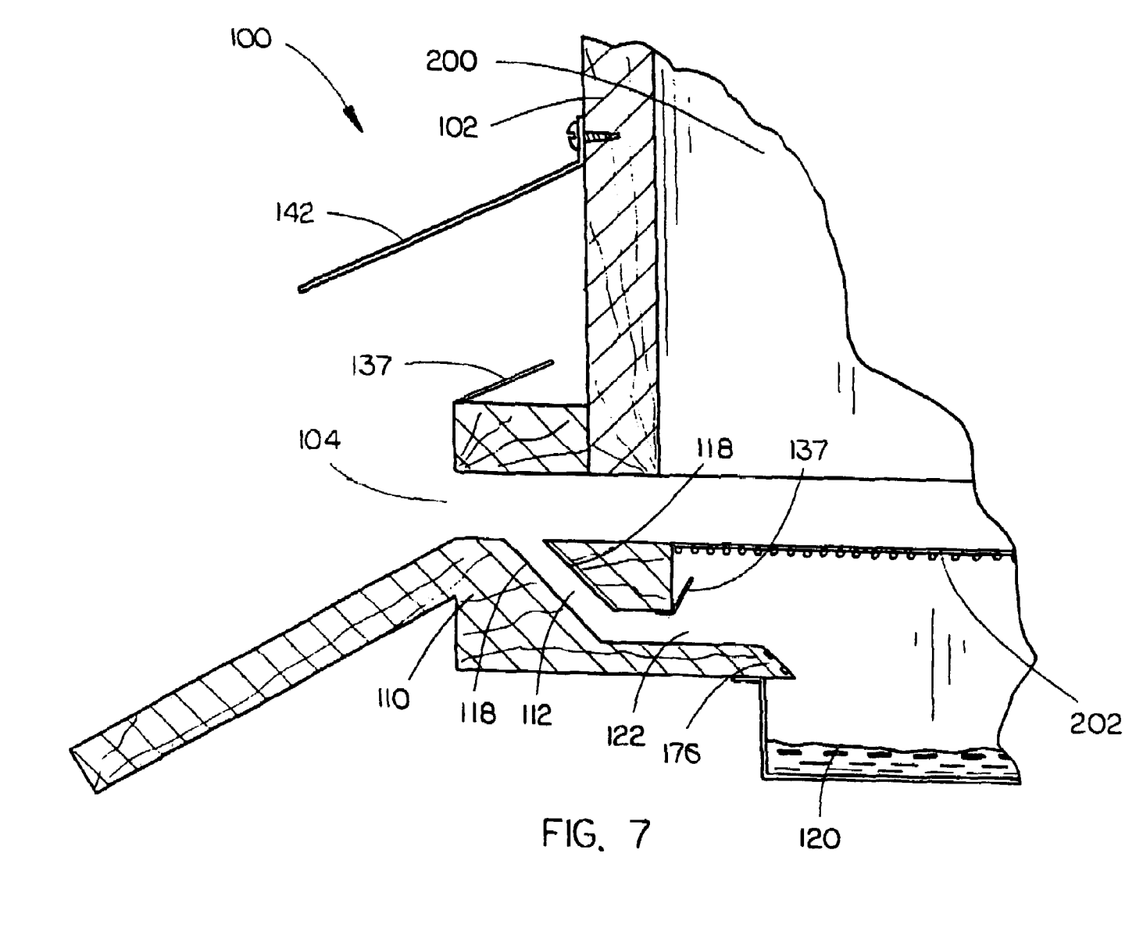
FIG. 7 illustrates a beehive including a selective insect trapping system for hindering access to an interior area of the beehive in accordance with an exemplary embodiment of the present invention.

In embodiments in which the groove 112 of the trap entry portion 110 is positioned under the hive entrance 104, as shown in FIG. 7, the trap entry portion 110 may be separated from the beehive's interior 200 by a screen 202, such as a wire mesh screen. For instance, the wire mesh screen 202 may have apertures sized (ex.—0.8 inches in diameter) so that the small hive beetles cannot pass through it, yet mites within the hive 100 may fall through it and out of the interior area 200 of the hive 100 into the oil-containing receptacle 120. The screen 202 may also allow air/scents from the beehive's interior 200 to emanate from the hive 100, thereby drawing the small hive beetles towards the scents, and thus, towards the trap entry portion 110, and the groove 112. In embodiments as shown in FIG. 7, the side walls 118 of groove 112 may be contoured or ramped to promote directing of the small hive beetles into the groove 112. Further, the groove 112 may be configured to direct the small hive beetles, via the passageway 122 to the oil receptacle 120 (ex.—a pan or pool of oil). Still further, the electronic insect control system 176 may be established in the passageway 122 for stunning/killing the small hive beetles via an electrostatic charge. In the embodiment shown in FIG. 7, the electronic insect control system 176 is established in proximity to the oil containing-receptacle 120, so that the stunned/killed small hive beetles may fall into the oil.

It is believed that the selective insect trapping system of the present invention and many of its attendant advantages will be understood by the forgoing description. It is also believed that it will be apparent that various changes may be made in the form, construction and arrangement of the components thereof without departing from the scope and spirit of the invention or without sacrificing all of its material advantages. The form herein before described being merely an explanatory embodiment thereof.

What is claimed is:

1. A selective insect trapping system, comprising:
a trap entry portion having a groove formed therein, the groove sized for receiving a small hive beetle, the groove having angled side walls which broaden towards a base of the groove for hindering the small hive beetle from climbing out of the groove, the groove having a depth which prevents the small hive beetle from being able to fly out of the groove; and
a receptacle configured for being connected to the trap entry portion, the receptacle being further configured for receiving and containing the small hive beetle,
wherein the trap entry portion has a passageway formed therein for allowing passage of the small hive beetle from the groove of the trap entry portion into the receptacle.

2. A selective insect trapping system as claimed in claim 1, wherein the groove has a width from 0.1 inches to 0.2 inches at an entry point generally opposite the base of the groove.

3. A selective insect trapping system as claimed in claim 1, wherein the groove has a depth from 0.15 inches to 0.25 inches.

4. A selective insect trapping system as claimed in claim 1, wherein the receptacle contains oil for drowning the small hive beetle.

5. A selective insect trapping system as claimed in claim 1, wherein the passageway allows passage of the small hive beetle into the receptacle via a funnel-shaped tube connected to the trap entry portion.

6. A selective insect trapping system as claimed in claim 1, wherein the system is configured for at least one of: positioning in front of an entrance to a beehive for hindering access to the entrance for the small hive beetles and for trapping the small hive beetles; positioning at an entrance to a beehive for hindering access to the beehive via the entrance for the small hive beetles and for trapping the small hive beetles; positioning within an entrance to a beehive for hindering access to the beehive via the entrance for the small hive beetles and for trapping the small hive beetles; positioning under an entrance to a beehive for hindering access to the beehive via the entrance for the small hive beetles and for trapping the small hive beetles; and connection to a top cover of a beehive for trapping the small hive beetles which have accessed an interior area of the beehive.

7. A selective insect trapping system as claimed in claim 6, wherein the groove of the trap entry portion receives the small hive beetle from the beehive's interior area via a cover passageway formed in the top cover.

8. A selective insect trapping system as claimed in claim 7, wherein an electronic insect control system configured for killing small hive beetles is included in the cover passageway.

9. A beehive, comprising:
a plurality of panels, at least one of the panels included in the plurality of panels having a beehive entrance formed therein, the beehive entrance sized for allowing honey bees to enter the beehive;
a top cover configured for connecting with the panels for forming an enclosure; and
a selective insect trapping system including a trap entry portion having a groove formed therein, the groove sized for receiving a small hive beetle, the groove having angled side walls which broaden towards a base of the groove for hindering the small hive beetle from climbing out of the groove, the groove having a depth which prevents the small hive beetle from being able to fly out of the groove, the selective insect trapping system further including a receptacle configured for being connected to the trap entry portion, the receptacle being further configured for receiving and containing the small hive beetle, the selective insect trapping system configured for at least one of: positioning in front of the entrance to the beehive for hindering access to the entrance for the small hive beetles and for trapping the small hive beetles; positioning at the entrance to the beehive for hindering access to the beehive via the entrance for the small hive beetles and for trapping the small hive beetles; positioning within the entrance to the beehive for hindering access to the beehive via the entrance for the small hive beetles and for trapping the small hive beetles; positioning under the entrance to the beehive for hindering access to the beehive via the entrance for the small hive beetles and for trapping the small hive beetles; and connecting to the top cover of the beehive for trapping the small hive beetles which have accessed an interior area of the beehive,
wherein the trap entry portion has a passageway formed therein for allowing passage of the small hive beetle from the groove of the trap entry portion into the receptacle.

10. A beehive as claimed in claim 9, wherein the beehive entrance is configured with at least one of: an angled top barrier entrance wall and a plurality of angled side barrier entrance walls for hindering entry of small hive beetles into the beehive via the beehive entrance.

11. A beehive as claimed in claim 9, further comprising:
a roof configured for being positioned above at least one of the hive entrance and the trap entry portion for directing water and debris away from at least one of the hive entrance and trap entry portion.

12. A beehive as claimed in claim 9, further comprising:
a screened enclosure configured for at least substantially covering the hive entrance and the trap entry portion, the screened enclosure including a screened enclosure entrance sized for allowing small hive beetles and honey bees to enter the screened enclosure, the screened enclosure further including a screened enclosure exit sized for allowing honey bees to fly out of the screened enclosure.

13. A beehive as claimed in claim 9, wherein at least one of the plurality of panels includes a ventilation aperture formed therethrough, the ventilation aperture being guarded by a guard device, the guard device including a first funnel and a second funnel, a narrow end of the first funnel being positioned over the ventilation aperture, a broad end of the second funnel being positioned over a broad end of the first funnel, the guard device configured for hindering small hive beetles from entering the beehive via the ventilation aperture.

14. A beehive as claimed in claim 9, further comprising:
a mounting board including a bee escape, the bee escape being recessed into the mounting board, the mounting board further including at least one of a top angled barrier wall and a plurality of side angled barrier walls for hindering access of small hive beetles to the bee escape.

15. A beehive as claimed in claim 14, wherein the top cover includes a top cover passageway formed therein, the top cover passageway configured and sized for directing small hive beetles towards the trap entry portion.

16. A top cover for a beehive, comprising:
a surface having an aperture formed therein, the aperture sized for allowing passage of a small hive beetle into a top cover passageway formed within an interior of the top cover and for preventing passage of a bee into the top cover passageway; and
a selective insect trapping system configured for connection to the top cover for trapping the small hive beetles, the selective insect trapping system including a trap entry portion having a groove formed therein, the groove sized for receiving the small hive beetle, the groove having angled side walls which broaden towards a base of the groove for hindering the small hive beetle from climbing out of the groove, the groove having a depth which prevents the small hive beetle from being able to fly out of the groove, the selective insect trapping system further including a receptacle configured for being connected to the trap entry portion, the receptacle being further configured for receiving and containing the small hive beetle, the trap entry portion having a passageway formed therein for allowing passage of the small hive beetle from the groove of the trap entry portion into the receptacle,
wherein the top cover passageway is configured for directing the received small hive beetle towards the trap entry portion.

17. A top cover for a beehive as claimed in claim 16, wherein the surface having the aperture formed therein is further constructed to include at least one of: a recess; a wall; and a partition for directing the small hive beetle towards the aperture.

18. A top cover for a beehive as claimed in claim 16, wherein the top cover is constructed with protruding corners configured for being received by the beehive, the corners being at least one of rounded and filleted corners.

19. A top cover for a beehive as claimed in claim 16, wherein the top cover is configured so that, when connected to the beehive, a distance of ¼ inches to ⅜ inches is maintained between top bars of the beehive and the top cover.

20. A top cover for a beehive as claimed in claim 16, wherein the groove of the top entry portion is formed with an overhang lip for hindering escape from the groove by the small hive beetle.

* * * * *